(12) United States Patent
Lee et al.

(10) Patent No.: US 7,496,264 B2
(45) Date of Patent: Feb. 24, 2009

(54) OPTICAL WAVEGUIDE

(75) Inventors: Gwan-Su Lee, Seoul (KR); Soo-Jin Jung, Seoul (KR); Dong-Ho Shin, Seoul (KR); Won-Hoe Koo, Seoul (KR); Il-Kweon Joung, Ansan (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 0 days.

(21) Appl. No.: 11/772,651

(22) Filed: Jul. 2, 2007

(65) Prior Publication Data

US 2008/0056660 A1    Mar. 6, 2008

(30) Foreign Application Priority Data

Aug. 29, 2006   (KR) ................. 10-2006-0082334

(51) Int. Cl.
    *G02B 6/10*    (2006.01)
(52) U.S. Cl. ................... 385/129; 385/130; 385/131; 385/132
(58) Field of Classification Search .......... 385/129–132
    See application file for complete search history.

(56) References Cited

U.S. PATENT DOCUMENTS 6,442,321 B1    8/2002  Berini
6,801,691 B2 *  10/2004 Berini ...................... 385/39

* cited by examiner

*Primary Examiner*—Jennifer Doan
(74) *Attorney, Agent, or Firm*—Lowe Hauptman Ham & Berner

(57) ABSTRACT

An optical waveguide includes a linear metallic thin film having a light delivering unit coupled to one end thereof, through which light is incident; and at least more than two dielectric layers surrounding the metallic thin film. In the optical waveguide, an effective refractive index and a propagation loss in the metallic thin film is reduced so that long-range light transmission is realized. Further, a loss of light caused by the coupling to optical fiber, which is coupled to one end of the metallic thin film, is simultaneously reduced.

26 Claims, 7 Drawing Sheets

[FIG. 1]
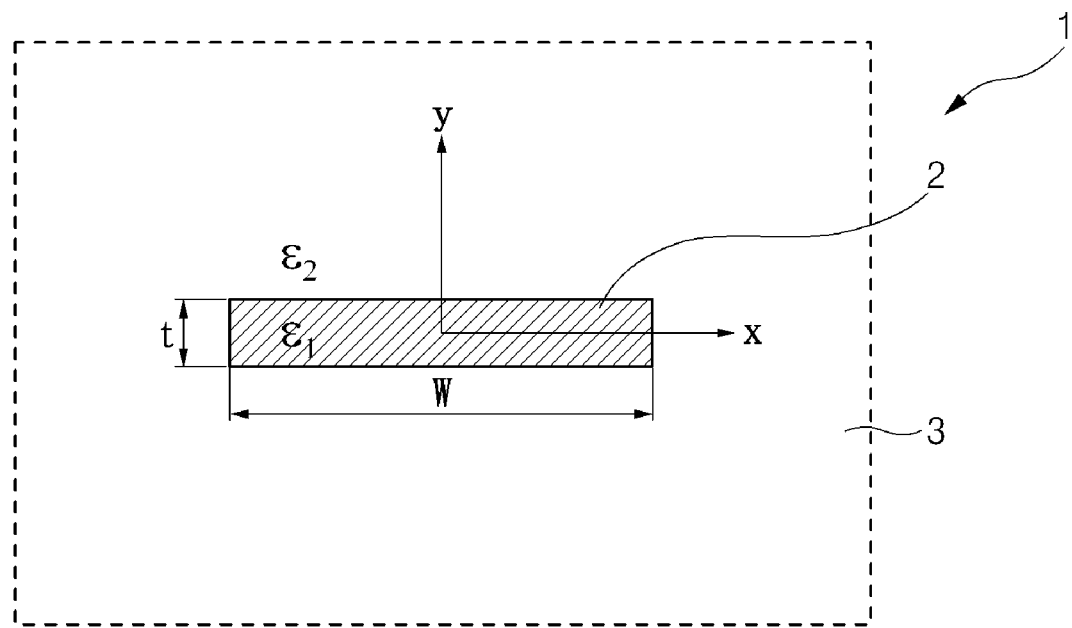
[FIG. 2]
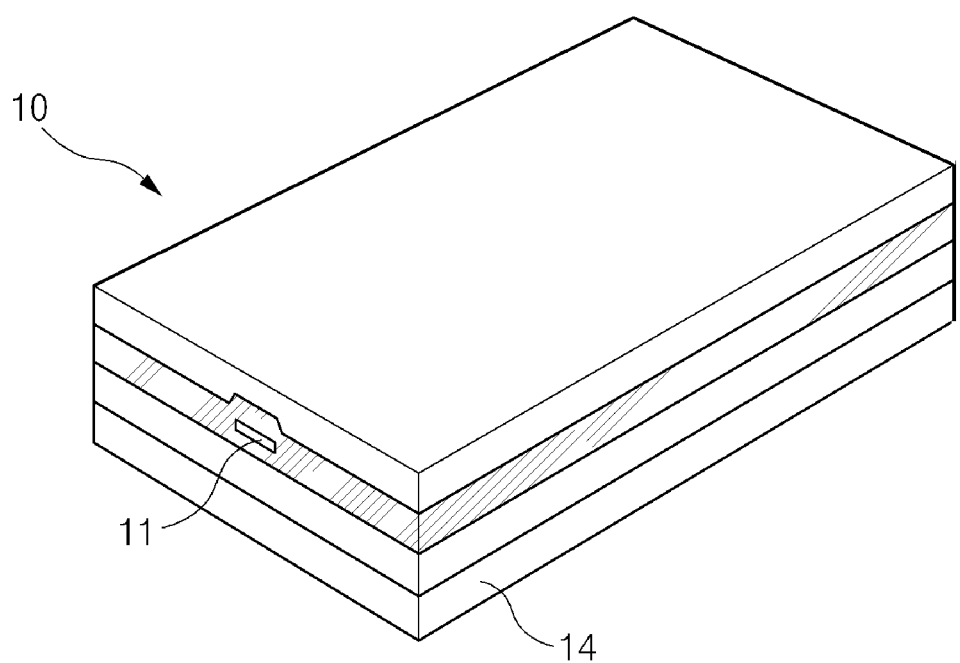

[FIG. 3]
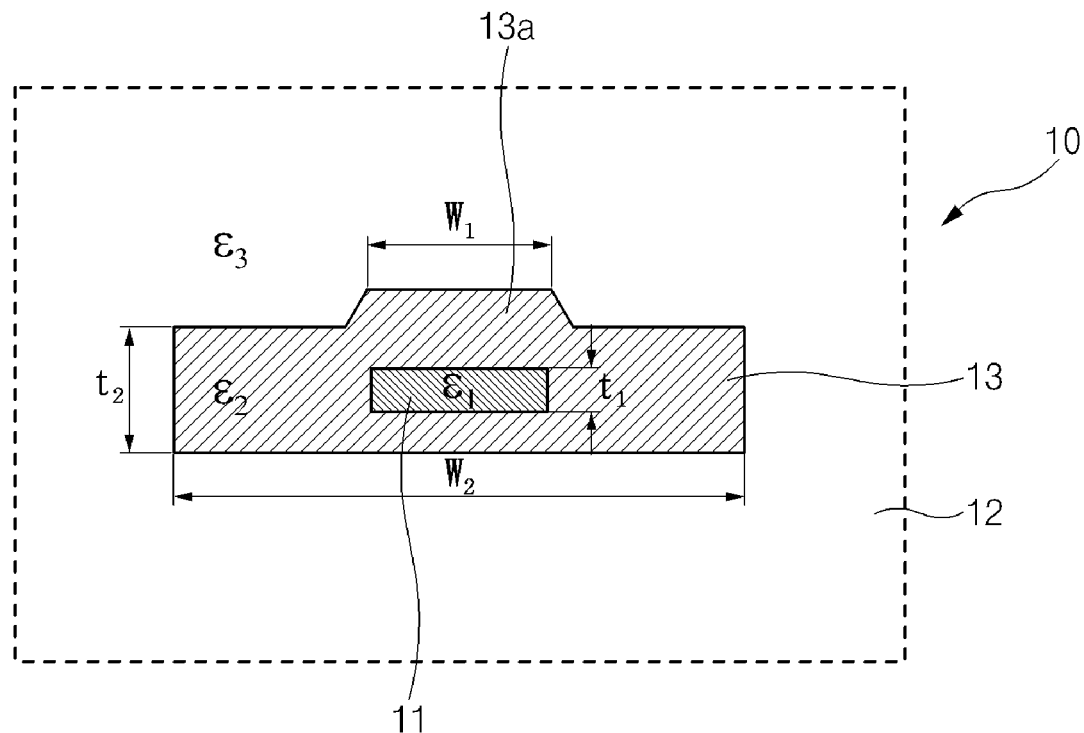
[FIG. 4A]
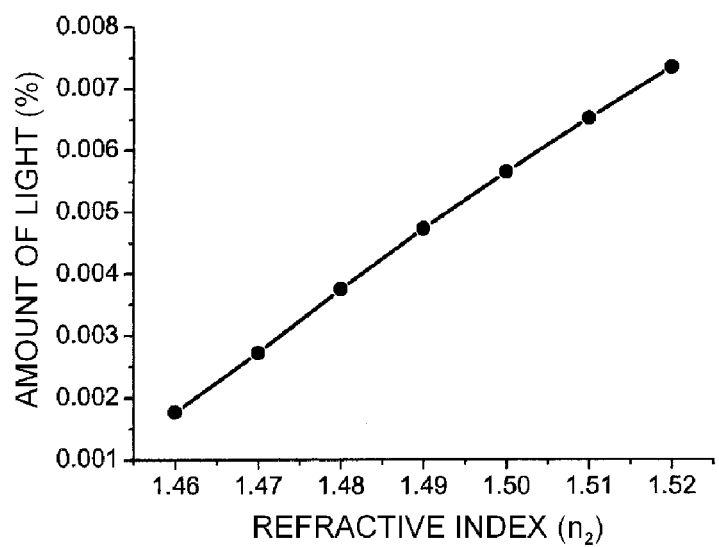

[FIG. 4B]
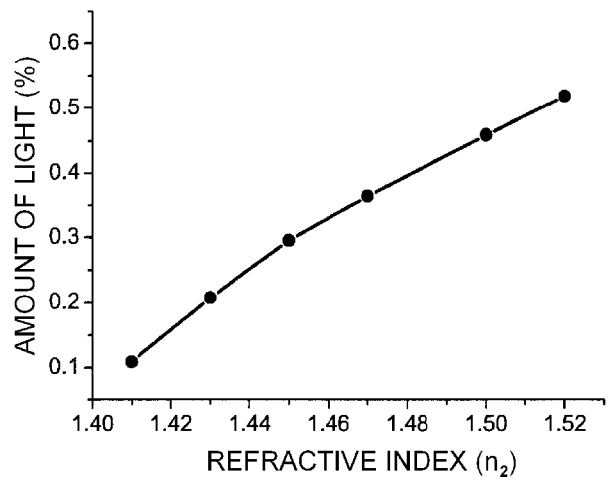
[FIG. 5A]
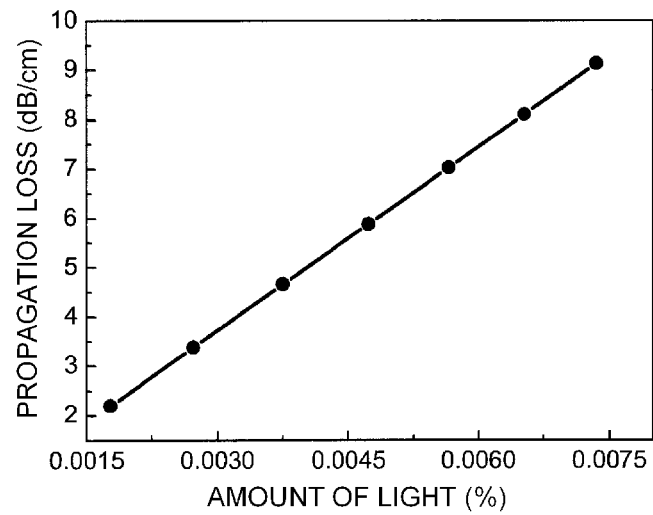
[FIG. 5B]
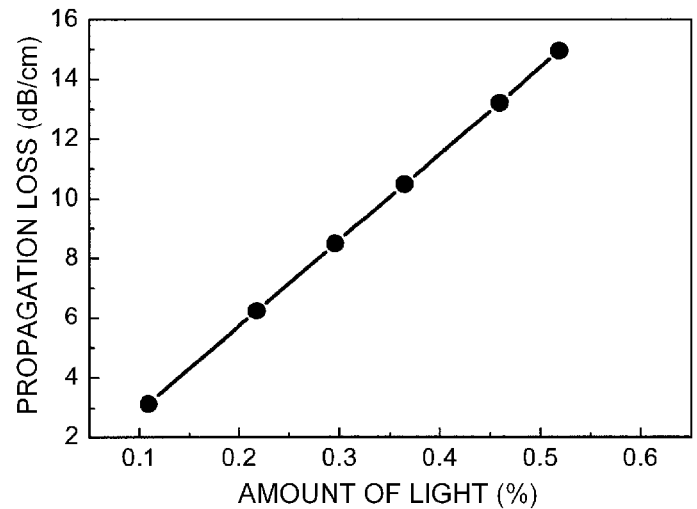

[FIG. 6]
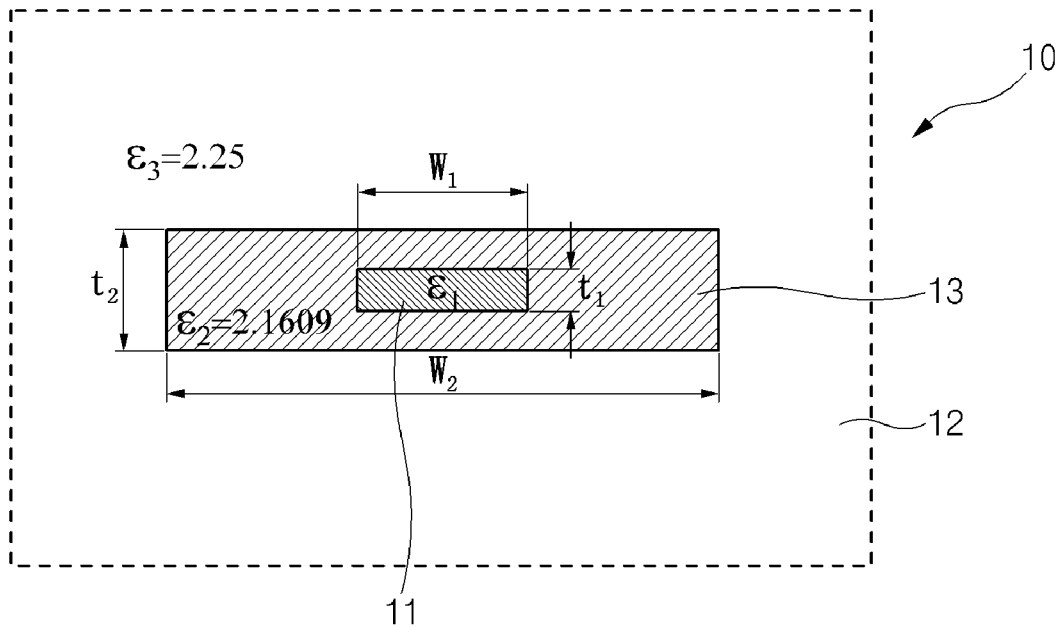
[FIG. 7A]
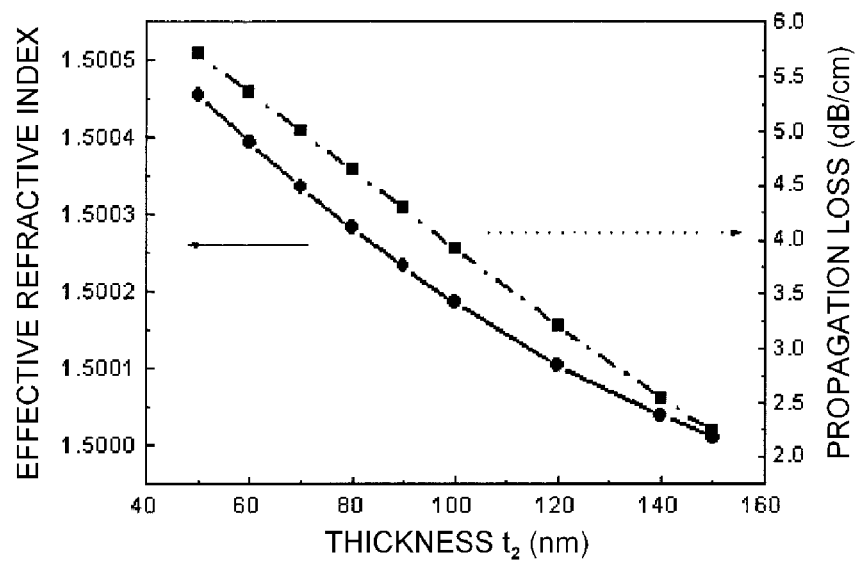

[FIG. 7B]
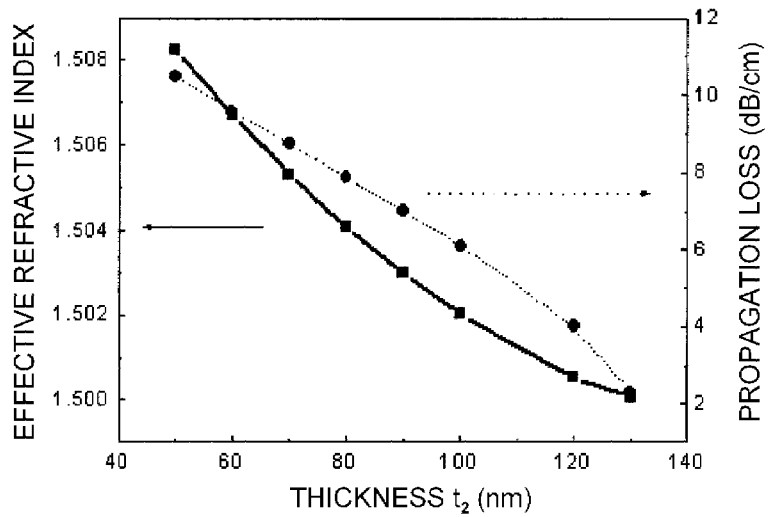
[FIG. 8]
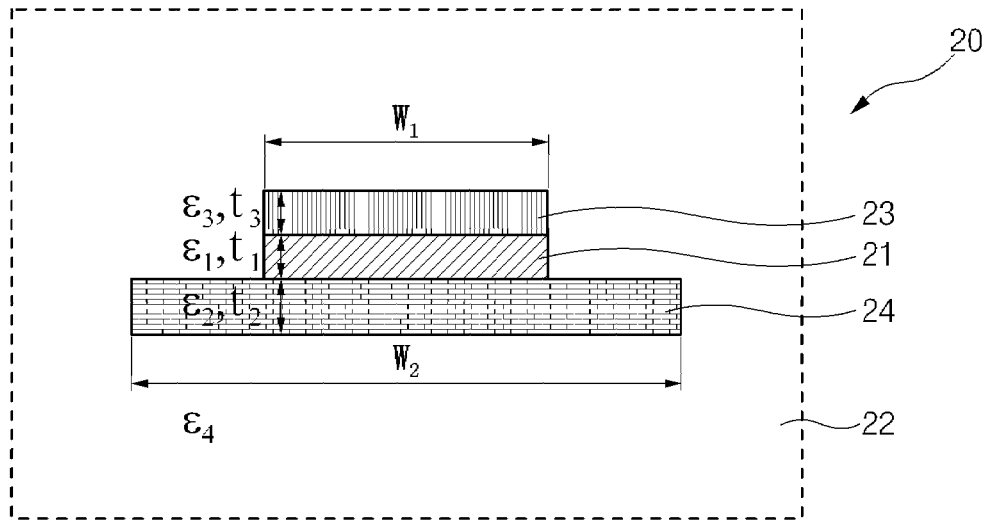
[FIG. 9A]
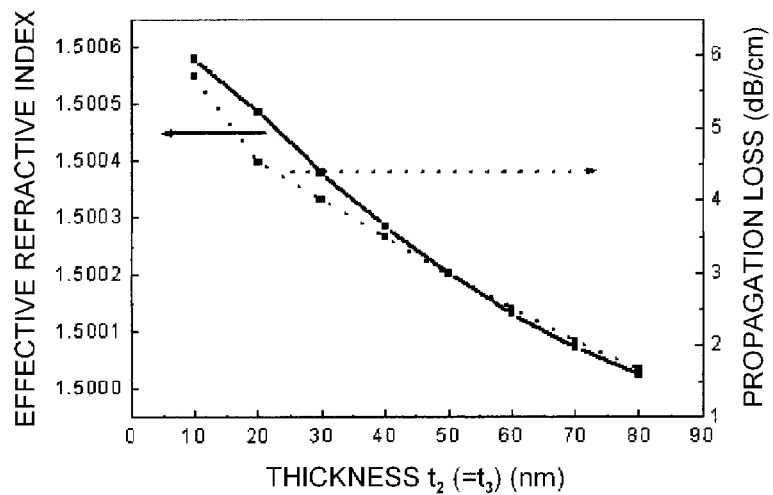

[FIG. 9B]
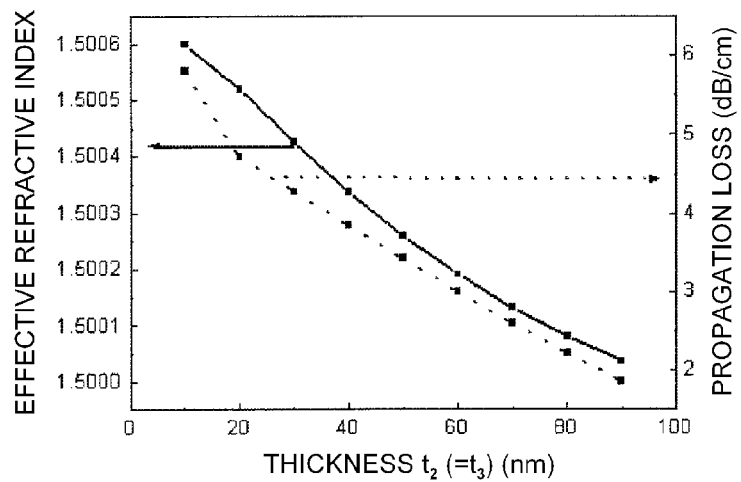
[FIG. 10]
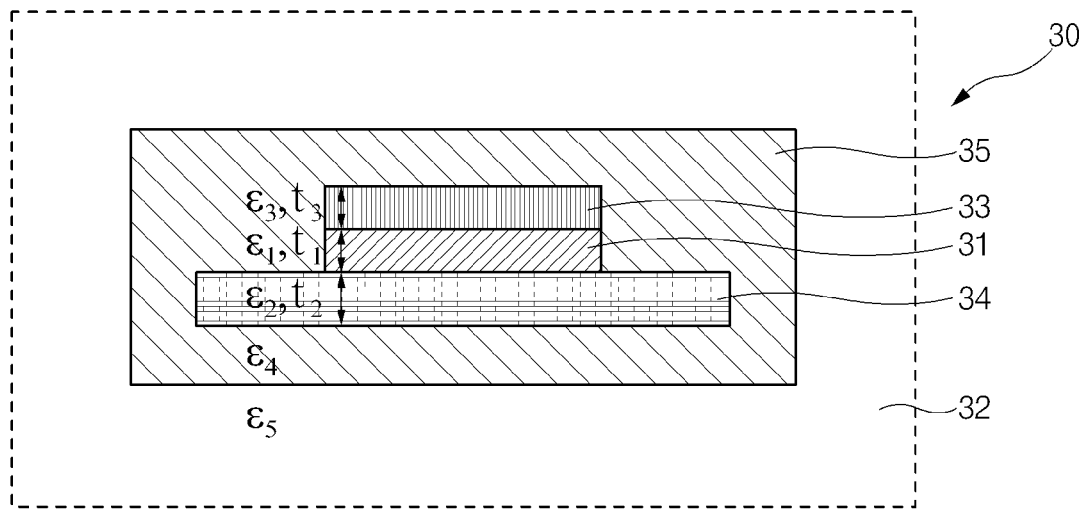

[FIG. 11]
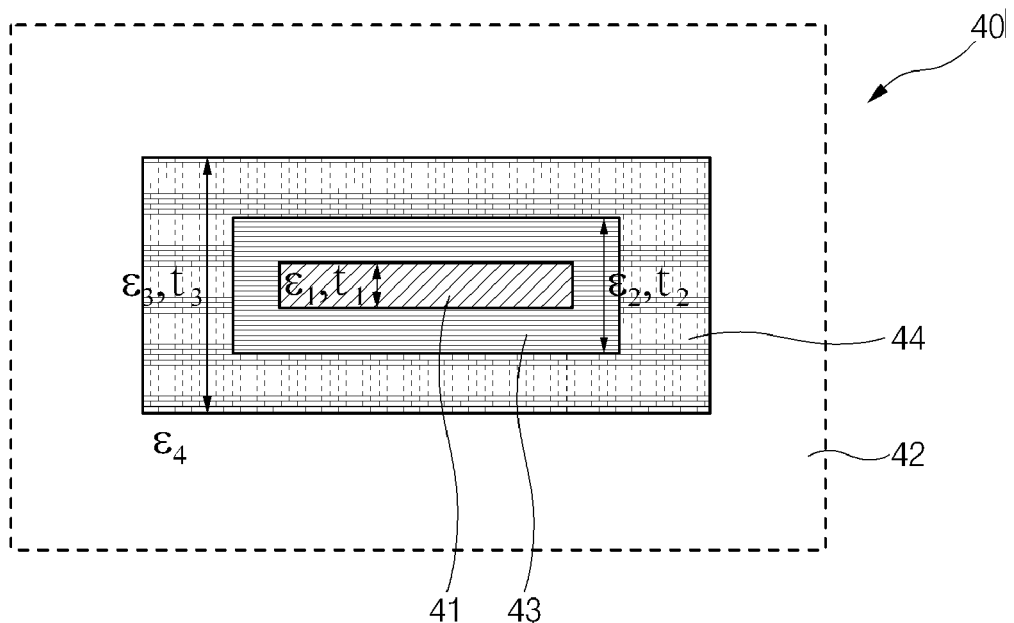
[FIG. 12]
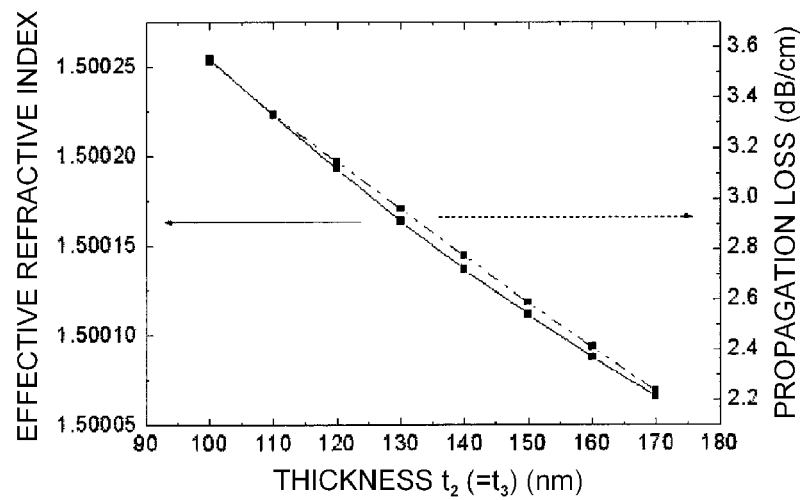
[FIG. 13]
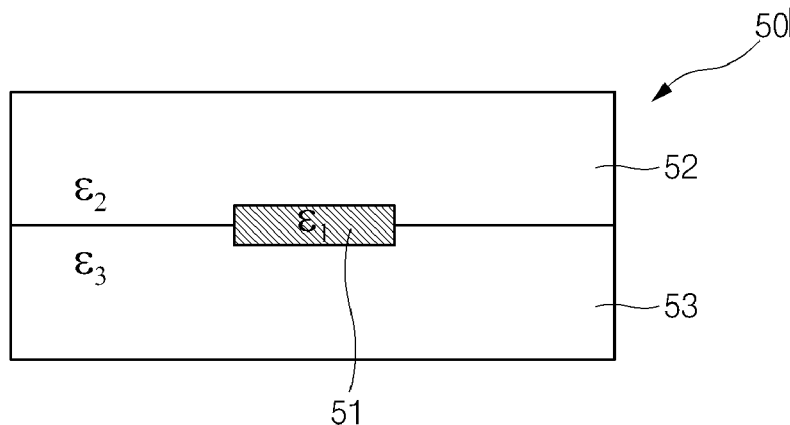

OPTICAL WAVEGUIDE

CROSS-REFERENCE TO RELATED APPLICATIONS

This application claims the benefit of Korean Patent Application No. 10-2006-0082334 filed with the Korea Intellectual Property Office on Aug. 29, 2006, the disclosure of which is incorporated herein by reference.

BACKGROUND OF THE INVENTION

1. Field of the Invention

The present invention relates to an optical waveguide, more specifically, to an optical waveguide in which dielectric layers surrounding a metallic thin film for propagating light are formed to have a different refractive index, and a propagation loss of the metallic thin film is minimized by a combination of thickness and refractive index of the dielectric layers, thereby implementing long-range light transmission.

2. Description of the Related Art

A surface plasmon is an oscillating wave which propagates along an interface between materials with permittivities having a reverse sign. In general, a surface plasmon exists at the interface between metal having the negative sign and a dielectric having the positive sign, and can be excited by electrons accelerated at high speed and optical waves. An electromagnetic wave which is coupled to a surface plasmon so as to propagate is referred to as a surface plasmon-polarion (hereinafter, referred to as "SPP").

Since the wave vector of the surface plasmon is larger than those of peripheral materials, the SPP is bound to a metal surface. Therefore, it can be considered that the interface between metal and a dielectric is a two-dimensional optical waveguide having a vertical confinement condition.

In view of the optical waveguide, the SPP to be generated at the interface between metal and a dielectric is effectively bound to a metal surface, while a propagation distance is as short as dozens of mm in a visible-ray region. However, when the thickness of metal is limited to several nm to dozens of nm such that the SPP propagating at the interface is coupled, long-range transmission of light can be realized. This is referred to as a long-range surface plasmon polariton (LR-SPP) mode. The field profile of the LR-SPP mode is widely distributed in a dielectric around a metallic thin film. Therefore, a propagation loss of light is small, and a coupling characteristic with optical fiber is excellent. Accordingly, the LR-SPP mode is applied to various optical element fields.

In general, the SPP mode of an optical waveguide in which a metallic thin film is interposed is divided into the LR-SPP mode and an SR-SPP (short range surface plasmon-polariton) mode. In the LR-SPP mode, the metallic thin film is formed to have a thickness of less than dozens of nm such that light is propagated by a long distance. In the SR-SPP mode, light is propagated through a waveguide having a relatively small size. The LR-SPP is currently applied to an optical waveguide element which is used in optical modulators, switches, couplers, filters, and optical sensors.

Such a conventional optical waveguide to be applied to various fields is disclosed in U.S. Pat. No. 6,442,321. Hereinafter, the construction thereof will be briefly examined, and the problems thereof will be described.

FIG. 1 is a sectional view of a conventional LR-SPP mode optical waveguide. The optical waveguide 1 includes a metallic thin film 2 formed of a material having high charge density or a negative permittivity and a dielectric layer 3 surrounding the metallic thin film 2, the dielectric layer 3 having a width w and thickness t in the same dimension as light emitted from the metallic thin film 2.

The metallic thin film 2 may be formed with a line, a curved line, a curved surface, or an inclined surface, depending on the structure of the optical waveguide.

In the conventional optical waveguide, when light is incident from the outside through the metallic thin film 2, the light corresponding to the LR-SPP mode is propagated along the metallic thin film 2. At this time, while the light is propagated along the metallic thin film 2, a propagation loss inevitably occurs. In order to reduce such a propagation loss, an amount of light to be propagated inside the metallic thin film 2 should be reduced. Therefore, the thickness t or width w of the metallic thin film 2 should be reduced.

However, since there a limit in manufacturing the metallic thin film 2, there is a limit in reducing the thickness t and width w of the metallic thin film 2. Therefore, there are difficulties in reducing a propagation loss of the metallic thin film 2.

In order to minimize a propagation loss through the metallic thin film 2, the metallic thin film 2 should be formed to have a thickness of less than 0 nm and a width of less than 1 µm. However, there is a limit in manufacturing a metallic thin film having a thickness of less than 10 nm and a width of less than 1 µm by using a current technique.

For wavelengths of 1550 nm and 633 nm which are representative optical-communication wavelengths to be used in the conventional optical waveguide, an effective refractive index, a propagation loss, and a loss of light (coupling loss) caused by the coupling to optical fiber are calculated as follows.

Since all the optical elements of the optical waveguide are connected to optical fiber, the coupling loss is considered. The metallic thin film 2 formed of gold has a permittivity $\epsilon_1$ of $-131+i\times12.65$ and $-19+i\times0.53$ corresponding to the wavelengths of 1550 nm and 633 nm, respectively. The dielectric layer 3 surrounding metallic thin film 2 has a permittivity $\epsilon_2$ of 2.25.

The thickness t and width w of the metallic thin film are set to 5 µm and 20 nm for the wavelength of 1550 nm and to 2 µm and 20 nm for the wavelength of 633 nm, respectively. The diameter of the optical fiber is set to 10.5 µm for the wavelength of 1550 nm and to 4.3 µm for the wavelength of 633 nm.

The effective refractive index, the propagation loss, and the coupling loss, which are calculated under the presented condition, are 1.50069, 7.44 dB/cm, and 0.24 dB for the wavelength of 1550 nm and 1.51393, 13.45 dB/cm, and 3.37 dB for the wavelength of 633 nm, respectively.

A propagation distance up to a spot, where the intensity of light decreases to $1/10$ in consideration of the propagation loss, is about 1.34 cm for the wavelength of 1550 nm and mo more than 0.74 mm for the wavelength of 633 nm. Therefore, when the LR-SPP mode optical element is used, the element should be manufactured to have a length of 1 cm for the wavelength of 1550 nm and a length of less than 1 mm for the wavelength of 633 nm, respectively.

SUMMARY OF THE INVENTION

An advantage of the present invention is that it provides an optical waveguide in which dielectric layers surrounding a metallic thin film for propagating light are formed to have a different refractive index, and a propagation loss of the metallic thin film is minimized by a combination of thickness and refractive index of the dielectric layers, thereby implementing long-range light transmission.

Additional aspect and advantages of the present general inventive concept will be set forth in part in the description which follows and, in part, will be obvious from the description, or may be learned by practice of the general inventive concept.

According to an aspect of the invention, an optical waveguide comprises a linear metallic thin film having a light delivering unit coupled to one end thereof, through which light is incident; and at least more than two dielectric layers surrounding the metallic thin film.

According to another aspect of the invention, the metallic thin film is formed of a material having high charge density. Light incident through the light delivering unit is transmitted along the metallic thin film in the longitudinal direction of the metallic thin film.

According to a further aspect of the invention, the metallic thin film is formed of gold (Au), silver (Ag), or an alloy of gold and silver or is formed to have a plated layer in which gold and sliver are sequentially plated.

According to a still further aspect of the invention, the respective dielectric layers surrounding the metallic thin film have a different refractive index, and the thicknesses and permittivities thereof are variable.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a sectional view of a conventional LR-SPP mode optical waveguide;

FIG. 2 is a perspective view of an optical waveguide according to a first embodiment of the invention;

FIG. 3 is a sectional view of the optical waveguide according to the first embodiment of the invention;

FIGS. 4A and 4B are graphs showing an amount of light existing inside a metallic thin film as a percentage when the refractive indexes of dielectric layers are changed in the optical waveguide according to the invention;

FIGS. 5A and 5B are graphs showing a change in propagation loss depending on an amount of light existing inside the metallic thin film in the optical waveguide according to the invention;

FIG. 6 is a sectional view of an optical waveguide according to a modification of the first embodiment;

FIGS. 7A and 7B are graphs showing an effective refractive index of a metallic thin film and a propagation loss when the thickness of a first dielectric layer changes in the optical waveguide according to the modification of the first embodiment;

FIG. 8 is a sectional view of an optical waveguide according to a second embodiment of the invention;

FIGS. 9A and 9B are graphs showing changes in effective refractive index and propagation loss when the permittivities of dielectric layers are changed in the optical waveguide according to the second embodiment;

FIG. 10 is a sectional view of an optical waveguide according to a third embodiment of the invention;

FIG. 11 is a sectional view of an optical waveguide according to a fourth embodiment of the invention;

FIG. 12 is a graph showing changes in effective refractive index and propagation loss when the thicknesses of dielectric layers are changed; and FIG. 13 is a sectional view of an optical waveguide according to a fifth embodiment of the invention.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Hereinafter, embodiments of the present invention will be described in detail with reference to the accompanying drawings.

First Embodiment

FIG. 2 is a perspective view of an optical waveguide according to a first embodiment of the invention, and FIG. 3 is a sectional view of the optical waveguide according to the first embodiment of the invention.

As shown in the drawings, the optical wave guide 10 includes a metallic thin film 11, a substrate 14, a dielectric layer 12 received on the substrate 14, and a first dielectric layer 13 with a predetermined thickness $t_2$ surrounding the outer surface of the metallic thin film 11. The first dielectric layer 13 is surrounded by the dielectric layer 12 of finite range.

The dielectric layer 12 and the first dielectric layer 13 having a different permittivity and a different refractive index are formed of a material having relatively low charge density. Preferably, the dielectric layer 12 and the first dielectric layer 13 are formed of an inorganic material such as silicon, glass, or polymer resin.

The refractive index of the first dielectric layer 13 surrounding the metallic thin film 11 has a smaller refractive index than the dielectric layer 12 of finite range. The first dielectric layer 13 has a protrusion 13a formed in the central portion of the upper surface thereof in a longitudinal direction of the metallic thin film 11. The protrusion 13a is formed to have a different width $W_1$, depending on a wavelength of 1550 nm or 633 nm.

The width $W_1$ of the first dielectric layer 13 is 5 μm at the wavelength of 1550 nm and 2 μm at the wavelength of 633 nm.

Since the dielectric layer 12 surrounding the first dielectric layer 13 of the optical waveguide 10 has an enormous size in comparison with the metallic thin film 11 having a dimension of dozens nm, the dielectric layer 12 is shown as a blank space in FIG. 3.

The metallic thin film 11 is formed of a metallic material having relatively high charge density. Preferably, the metallic thin film 11 is formed of gold (Au), silver (Ag), or an alloy of gold and silver or is formed to have a plated layer in which gold and sliver are sequentially plated. One end of the metallic thin film 11 is connected to a light delivering unit (not shown) through which light is incident. As for the light delivering unit, optical fiber can be exemplified.

Light incident through the light delivering unit is propagated inside the optical waveguide 10 through the metallic thin film 11. In this case, since the first dielectric layer 13 surrounding the metallic thin film 11 and the dielectric layer 12 of finite range have a different refractive index, a propagation loss and a coupling loss caused by the coupling with the optical fiber are minimized.

Further, as the permittivities $\epsilon_2$ and $\epsilon_3$ of the respective dielectric layers 12 and 13 having a different refractive index are increased and decreased, a propagation loss and a coupling loss having the same range can be reduced in the same range.

As such, since the dielectric layers 12 and 13 wrapping the outer surface of the metallic thin film 11 has a different refractive index, a propagation loss is reduced. The reason is as follows. Since light to be transferred along the metallic thin film 11 at the LR-SPP mode of the optical waveguide 10 tends to be distributed in a dielectric layer having a large refractive index, an amount of light existing in the metallic thin film 11 decreases so that a propagation loss of light through the metallic thin film 11 at the LR-SPP mode is reduced.

That is, an amount of light existing inside the metallic thin film 11 surrounded by the first dielectric layer 13 is reduced by using such a property that some of light to be propagated along the metallic thin film 11 tends to be distributed in the dielectric layer 12 having a larger refractive index than the first dielectric layer 13. Then, a propagation loss caused by the dispersion of light to be transmitted through the metallic thin film 11 is reduced.

On the contrary, if the first dielectric layer 13 has a higher refractive index than the dielectric layer 12 having a finite range, light on the metallic thin film 11 is not emitted outside the metallic thin film 11 but is concentrated around the metallic thin film, due to such a property that the light on the metallic thin film 11 tends to be distributed in a dielectric layer having a larger refractive index. Therefore, a propagation loss increases.

In this case, such a phenomenon that light to be propagated through the metallic thin film 11 is integrated into a small size can be applied to other fields.

FIGS. 4A and 4B are graphs showing an amount of light in the metallic thin film 11 as a percentage when the refractive indexes of the respective dielectric layers are changed in the optical waveguide according to the invention. As shown in FIGS. 4A and 4B, it can found that, as the refractive index of the first dielectric layer 13 decreases, an amount of light inside the metallic thin film 11 gradually decreases. That is because light to be propagated through the metallic thin film 11 at the LR-SPP mode is distributed so as to be biased to the dielectric layer 12 having a larger refractive index.

Specifically, when the refractive index of the first dielectric layer 13 decreases from 1.52 to 1.46 in FIG. 4A showing a case of light with a wavelength of 1550 nm, an amount of light inside the metallic thin film 11 decreases from 0.0074% to 0.0018%.

At this time, when the refractive index of the first dielectric layer 13 is less than 1.46, the LR-SPP mode is not maintained. That is because, when the first dielectric layer 13 has a refractive index less than a reference refractive index, the dispersion of light of the first dielectric layer 13 into the dielectric layer 12 of finite range is accelerated so that a confinement mode for smoothly transmitting light through the metallic thin film 11 is not maintained.

Therefore, when light with a wavelength of 1550 nm is transmitted through the metallic thin film 11, the refractive index of the first dielectric layer 13 should be maintained at more than 1.46.

In FIG. 4B showing a case of light with a wavelength of 633 nm, when the refractive index of the first dielectric layer 13 increases from 1.41 to 1.52, an amount of light existing inside the metallic thin film 11 increases from 0.11% to 0.52%.

Therefore, when light with a wavelength of 633 nm is used, the LR-SPP mode is maintained until the refractive index of the first dielectric layer 13 approaches 1.41, different from the case of light with a wavelength of 1550 nm.

When light to be transmitted through the metallic thin film 11 has a short wavelength, and although the refractive index of the first dielectric layer is somewhat small, the LS-SPP mode can be maintained, because the effective refractive index of the first dielectric layer 13 is large.

FIGS. 5A and 5B are graphs showing a change in propagation loss depending on an amount of light existing inside the metallic thin film in the optical waveguide according to the invention. As described above, it can be found that, as an amount of light existing inside the metallic thin film 11 at the wavelengths of 1550 nm and 633 nm decreases, a propagation loss also decreases.

Further, it can be found that, when the lights with wavelengths of 1550 nm and 633 nm are compared with each other, an amount of light with a wavelength of 1550 nm existing inside the metallic thin film 11 is relatively small.

In FIG. 4A, the effective refractive index, the propagation loss, and the optical-fiber coupling loss, which are calculated for the wavelength of 1550 nm, are 1.500115, 3.38 dB/cm, and 1.36 dB, respectively. In FIG. 4B, the effective refractive index, the propagation loss, and the optical-fiber coupling loss, which are calculated for the wavelength of 633 nm, are 1.500253, 3.38 dB/cm, and 0.69 dB, respectively.

Modification of First Embodiment

FIG. 6 is a sectional view of an optical waveguide according to a modification of the first embodiment. As shown in FIG. 6, the optical waveguide 10 includes a metallic thin film 11, a substrate 14, a dielectric layer 12 of finite range received on the substrate 14, and a first dielectric layer 13 with a predetermined thickness surrounding the metallic thin film 11. The first dielectric layer 13 is surrounded by the dielectric layer 12. The upper surface of the first dielectric layer 13 is formed with a flat surface.

This modification is implemented so as to examine characteristics of the LS-SPP mode in accordance with a change in thickness $t_2$ of the first dielectric layer 13 surrounding the metallic thin film 11. As the thickness $t_2$ of the first dielectric layer 13 having a relatively lower refractive index than the dielectric layer 12 of finite range increases, an effective refractive index and a propagation loss at the LR-SPP mode simultaneously decrease.

FIGS. 7A and 7B are graphs showing an effective refractive index of the metallic thin film and a propagation loss when the thickness of the first dielectric layer changes in the optical waveguide of this modification. In FIG. 7A showing a case of wavelength of 1550 nm, when the thickness $t_2$ of the first dielectric layer 13 is increased from 50 nm to 150 nm, the effective refractive index of the metallic thin film decreases from 1.50046 to 1.50001, and the propagation loss decreases from 5.7 dB/cm to 2.2 dB/cm.

Further, in FIG. 7B showing a case of wavelength of 633 nm, when the thickness $t_2$ of the first dielectric layer 13 is increased from 50 nm to 130 nm, the effective refractive index of the metallic thin film decreases from 1.508 to 1.500, and the propagation loss decreases from 10.5 dB/cm to 2.3 dB/cm.

Such an effect that a propagation loss is reduced in accordance with a change in thickness of the first dielectric layer 13 can be also applied to the first embodiment. In the first embodiment and the modification, the reason why a propagation loss is reduced in accordance with a change in thickness of the first dielectric layer 13 is as follows. As the thickness $t_2$ of the first dielectric layer 13 having a smaller refractive index than the dielectric layer 12 of finite range is increased, the effective refractive index of the first dielectric layer 13 decreases. Therefore, when light is transmitted through the metallic thin film 11, a propagation loss caused by the accelerated dispersion of light to the outside is reduced.

The technical feature of the invention, which can be understood through the first embodiment and the modification, is that the dielectric layers 12 and 13 having a different permittivity and a different refractive index are coupled so as to surround the metallic thin film 11 of the optical waveguide 10, thereby reducing a propagation loss. Further, the size of the LR-SPP mode is reduced to increase a light transmission distance.

Accordingly, it is possible to manufacture an optical waveguide of LR-SPP mode in which more than two dielectric layers having a different refractive index are sequentially laminated and combined outside the metallic thin film 11, thereby implementing a variety of long-range light transmission characteristics through the metallic thin film 11.

Second Embodiment

FIG. 8 is a sectional view of an optical waveguide according to a second embodiment of the invention. As shown in FIG. 8, the optical waveguide 20 includes a linear metallic thin film 21, a second dielectric layer 23 having the same width $W_1$ as the metallic thin film 21, a third dielectric layer 24 having a larger width $W_2$ than the metallic thin film 21, and a dielectric layer 22 of finite range surrounding the metallic thin film 21 and the second and third dielectric layers 23 and 24. The second dielectric layer 23 is received on the metallic thin film 21, and the third dielectric layer 24 is coupled to the bottom surface of the metallic thin film 21.

The optical waveguide 20 according to this embodiment is formed with a four-layer structure from the metallic thin film 21 to the outermost dielectric layer 22 of finite range. The second and third dielectric layers 23 and 24 have the same thickness $t_2$ and $t_3$ and the same permittivity of 2.1609, and the dielectric layer 22 of finite range has a permittivity of 2.25.

In this embodiment, an effective refractive index and a propagation loss at the LR-SPP mode in accordance with changes in thickness of the second and third dielectric layers 23 and 24 are similar to the data of FIGS. 7A and 7B which are calculated in the above-described modification of the first embodiment.

Meanwhile, when the thicknesses $t_2$ and $t_3$ of the second and third dielectric layers 23 and 24 surrounding the metallic thin film 21 are maintained to be identical, and if the permittivity of the second dielectric layer 23 is set to differ from that of the third dielectric layer 24, calculation results to be shown in FIGS. 9A and 9B can be obtained.

FIGS. 9A and 9B are graphs showing changes in effective refractive index and propagation loss when the permittivities of the respective dielectric layers are changed in the optical waveguide according to the second embodiment. As shown in FIGS. 9A and 9B, it can be found that, as the permittivities of the respective dielectric layers are changed at wavelengths of 1550 nm and 633 nm, the effective refractive index of the metallic thin film and the propagation loss change.

Third Embodiment

FIG. 10 is a sectional view of an optical waveguide according to a third embodiment of the invention. As shown in FIG. 10, the optical waveguide 30 includes a linear metallic thin film 31, a second dielectric layer 33 which is received on the metallic thin film 31, a third dielectric layer 34 which is coupled to the bottom surface of the metallic thin film 31, a fourth dielectric layer 35 surrounding the metallic thin film 31 and the second and third dielectric layers 33 and 34, and a dielectric layer 32 of finite range surrounding the fourth dielectric layer 35, thereby forming a multilayer structure.

The second dielectric layer 33 on the metallic thin film 31 is formed to have the same thickness as the third dielectric layer 34 under the metallic thin film 31. Further, the second dielectric layer 33 is formed to have the same width as the metallic thin film 31.

The technical construction of this embodiment is the same as the second embodiment, except for the above-described structure. Further, the calculation results of effective refractive index and propagation loss in accordance with changes in thicknesses and permittivities of the respective dielectric layers are substantially the same as the data of the above-described embodiments. Therefore, the descriptions thereof will be omitted.

Fourth Embodiment

FIG. 11 is a sectional view of an optical waveguide according to a fourth embodiment of the invention. As shown in FIG. 11, the optical waveguide 40 includes a linear metallic thin film 41, a fifth dielectric layer 43 surrounding the metallic thin film 41, a sixth dielectric layer 44 surrounding the fifth dielectric layer 43, and a dielectric layer 42 of finite range surrounding the sixth dielectric layer 44. The fifth and sixth dielectric layers have a predetermined thickness.

Such a structure is similar to that of the optical waveguide 10 (shown in FIG. 6) according to the modification of the first embodiment, if a different dielectric layer is inserted between the metallic thin film 11 and the first dielectric layer 13 or between the first dielectric layer 13 and the dielectric layer 12.

FIG. 12 shows changes in effective refractive index and propagation loss when the thicknesses of the respective dielectric layers 43 and 44 are changed.

It can be found that FIG. 12 shows changes in effective refractive index and propagation loss which are similar to those shown in FIG. 7.

Accordingly, the calculation results of effective refractive index and propagation loss in this embodiment are similar to those of the first to third embodiments. Therefore, the descriptions thereof will be omitted.

Meanwhile, even in a fifth embodiment in which a pair of dielectric layers 52 and 53 having a different refractive index and a different permittivity are formed on and under a metallic thin film 51 such that a refractive index consecutively changes through the dielectric layers 52 and 53, the calculation results of effective refractive index and propagation loss are similar to those of the above-described embodiments.

According to the optical waveguide of the invention, the metallic thin film is surrounded by the plurality of dielectric layers having a different refractive index such that an effective refractive index and a propagation loss in the metallic thin film can be reduced in the optical waveguide of the LR-SPP mode, which makes it possible to perform long-range light transmission. Further, when light with a wavelength of 633 nm is transmitted through the metallic thin film, a loss of light caused by the coupling with the optical fiber coupled to one end of the metallic thin film can be reduced at the same time.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An optical waveguide, comprising:
a linear metallic thin film; and
at least more than two dielectric layers surrounding the metallic thin film;
wherein the dielectric layers are composed of a dielectric layer of finite range with respect to the metallic thin film and a first dielectric layer which is formed between the dielectric layer and the metallic thin film so as to surround the outer surface of the metallic thin film.

2. The optical waveguide according to claim 1,
wherein light incident on one end of the metallic thin film is transmitted along the surface of the metallic thin film in the SPP (Surface Plasmon Polariton) mode.

3. The optical waveguide according to claim 1,
wherein the metallic thin film is formed of a material having high charge density, the metallic thin film having a light delivering unit coupled to one end thereof, though which light is incident.

4. The optical waveguide according to claim 1,
wherein the metallic thin film is formed of gold (Au), silver (Ag), or an alloy of gold and silver or is formed to have a plated layer in which gold and sliver are sequentially plated.

5. The optical waveguide according to claim 1,
wherein the respective dielectric layers surrounding the metallic thin film have different refractive indices, and the thicknesses and permittivities thereof are variable.

6. The optical waveguide according to claim 1,
wherein the first dielectric layer has a smaller refractive index than the dielectric layer of finite range.

7. The optical waveguide according to claim 1,
wherein the first dielectric layer has a protrusion formed in the central portion of the upper surface thereof in the longitudinal direction of the metallic thin film, the protrusion having a width that depends on a wavelength of light to be transmitted along the waveguide.

8. The optical waveguide according to claim 3,
wherein in the metallic thin film, a propagation loss and a loss of light caused by the coupling with the light delivering unit are minimized by a difference in refractive index between the first dielectric layer and the dielectric layer of finite range and by changing permittivities of the respective dielectric layers.

9. The optical waveguide according to claim 1,
wherein the thickness of the first dielectric layer having a flat upper surface is changed so that an effective refractive index and a propagation loss in the metallic thin film are minimized.

10. An optical waveguide comprising:
a linear metallic thin film;
a second dielectric layer received on the metallic thin film, the second dielectric layer having the same width as the metallic thin film;
a third dielectric layer coupled to the bottom surface of the metallic thin film, the third dielectric layer having a larger width than the metallic thin film; and
a dielectric layer of finite range surrounding the metallic thin film and the second and third dielectric layers.

11. The optical waveguide according to claim 10,
wherein the second and third dielectric layers have the same thickness and permittivity.

12. The optical waveguide according to claim 10,
wherein the thicknesses of the second and third dielectric layers are set to be identical, and the permittivities of the second and third dielectric layers are set to differ from each other such that a propagation loss is reduced.

13. The optical waveguide according to claim 10,
wherein the metallic thin film is formed of a material having high charge density, the metallic thin film having a light delivering unit coupled to one end thereof, though which light is incident.

14. The optical waveguide according to claim 10,
wherein the metallic thin film is formed of gold (Au), silver (Ag), or an alloy of gold and silver or is formed to have a plated layer in which gold and sliver are sequentially plated.

15. The optical waveguide according to claim 10,
wherein the respective dielectric layers surrounding the metallic thin film have different refractive indices, and the thicknesses and permittivities thereof are variable.

16. The optical waveguide according to claim 10,
wherein the second and third dielectric layers have a smaller refractive index than the dielectric layer of finite range.

17. An optical waveguide comprising:
a metallic thin film;
a second dielectric layer received on the metallic thin film;
a third dielectric layer coupled to the bottom surface of the metallic thin film;
a fourth dielectric layer surrounding the metallic thin film and the second and third dielectric layers; and
a dielectric layer of finite range surrounding the fourth dielectric layer.

18. The optical waveguide according to claim 17,
wherein the second dielectric layer is formed to have the same thickness as the third dielectric layer under the metallic thin film and is formed to have the same width as the metallic thin film.

19. The optical waveguide according to claim 17,
wherein the metallic thin film is formed of a material having high charge density, the metallic thin film having a light delivering unit coupled to one end thereof, though which light is incident.

20. The optical waveguide according to claim 17,
wherein the metallic thin film is formed of gold (Au), silver (Ag), or an alloy of gold and silver or is formed to have a plated layer in which gold and sliver are sequentially plated.

21. The optical waveguide according to claim 17,
wherein the respective dielectric layers surrounding the metallic thin film have different refractive indices, and the thicknesses and permittivities thereof are variable.

22. The optical waveguide according to claim 17,
wherein the second to fourth dielectric layers have a smaller refractive index than the dielectric layer of finite range.

23. An optical waveguide comprising:
a linear metallic thin film;
a fifth dielectric layer surrounding the metallic thin film, the fifth dielectric layer having a predetermined thickness;
a sixth dielectric layer surrounding the fifth dielectric layer, the sixth dielectric layer having a predetermined thickness; and
a dielectric layer of finite range surrounding the sixth dielectric layer.

24. The optical waveguide according to claim 23,
wherein the metallic thin film is formed of a material having high charge density, the metallic thin film having a light delivering unit coupled to one end thereof, though which light is incident.

25. The optical waveguide according to claim 23,
wherein the metallic thin film is formed of gold (Au), silver (Ag), or an alloy of gold and silver or is formed to have a plated layer in which gold and sliver are sequentially plated.

26. The optical waveguide according to claim 23, wherein the respective dielectric layers surrounding the metallic thin film have different refractive indices, and the thicknesses and permittivities thereof are variable.

* * * * *